(12) United States Patent
Rankin

(10) Patent No.: US 6,240,793 B1
(45) Date of Patent: Jun. 5, 2001

(54) AUTOMATED CONFIRMATION OF THE PRESENCE OF AT LEAST ONE RING IN AN ARTICLE OF MANUFACTURE DURING ASSEMBLY OF THE ARTICLE OF MANUFACTURE

(75) Inventor: Brent C. Rankin, Lima, OH (US)

(73) Assignee: Honda of America, Mfg. Inc., Marysville, OH (US)

( * ) Notice: Subject to any disclaimer, the term of this patent is extended or adjusted under 35 U.S.C. 154(b) by 0 days.

(21) Appl. No.: 09/334,034

(22) Filed: Jun. 15, 1999

(51) Int. Cl.$^7$ .................................................. G01N 19/00
(52) U.S. Cl. .......................................................... 73/865.9
(58) Field of Search ................................ 73/865, 9, 168, 73/862.36, 862.621, 862.041, 862.042, 862.043, 862.642, 862.57

(56) References Cited

U.S. PATENT DOCUMENTS

| | | | |
|---|---|---|---|
| 4,755,636 | 7/1988 | Akio | 200/82 |
| 4,755,637 | 7/1988 | Turck | 200/82 |
| 5,488,860 | 2/1996 | Speck et al. | 73/168 |
| 5,497,669 | 3/1996 | Hafner | 73/862 |

*Primary Examiner*—William Oen
(74) *Attorney, Agent, or Firm*—Monica H. Choi

(57) ABSTRACT

The present invention is a testing apparatus and method for automatically confirming the presence of all of at least one ring within a groove of an article of manufacture, such as a piston of a vehicle engine, during assembly of the article of manufacture. An air flow is applied on the groove, and the resulting amount of air flow through the groove depends on the presence of each of the at least one ring within the groove. This resulting amount of air flow through the groove is measured for determining whether all of the at least one ring is present within the groove. If any of the at least one ring is absent from the groove, an alarm indication of this undesired situation is provided. Use of a microcontroller allows for calibration of the components in the testing apparatus of the present invention and allows for monitoring for proper calibration of such components. Such calibration and monitoring by the microcontroller results in reliable confirmation of the presence of all of the at least one ring within the groove of the article of manufacture.

31 Claims, 6 Drawing Sheets

AUTOMATED CONFIRMATION OF THE PRESENCE OF AT LEAST ONE RING IN AN ARTICLE OF MANUFACTURE DURING ASSEMBLY OF THE ARTICLE OF MANUFACTURE

TECHNICAL FIELD

The present invention relates to testing systems used during assembly of an article of manufacture, such as a piston of a vehicle engine, and more particularly to an automated apparatus and method for confirming presence of at least one ring within a groove of the article of manufacture by measuring air flow within the groove, during assembly of the article of manufacture.

BACKGROUND OF THE INVENTION

The present invention will be described for confirming the presence of at least one ring within a groove of a piston of a vehicle engine during assembly of the piston. However, the present invention may be used for confirming the presence of at least one ring within a groove of any type of article of manufacture during assembly of the article of manufacture, as would be apparent to one of ordinary skill in the art from the description herein.

Referring to FIG. 1, a piston 100 is a common component of a vehicle engine, and the piston 100 typically has several types of rings assembled into grooves on the outside of the piston 100, as known to one of ordinary skill in the art of vehicle system design. For example, the piston 100 of FIG. 1 has a first compression ring 102 assembled into a first groove on the piston 100, a second compression ring 104 assembled into a second groove on the piston 100, and an oil ring assembly 106 assembled into a third groove on the piston 100.

FIG. 2 shows an enlarged view of the second compression ring 104 and the oil ring assembly 106 within the dashed box of FIG. 1. Referring to FIG. 2, the second compression ring 104 is one solid ring assembled into the second groove 108 on the piston 100. The oil ring assembly 106 includes three separates rings assembled into the third groove 110 on the piston 100. The oil ring assembly 106 includes a first scraper ring 112, a second scraper ring 114, and a separator ring 116 disposed between the first scraper ring 112 and the second scraper ring 114.

These rings 102, 104, 112, 114, and 116 are typically assembled into the grooves of the piston 110 manually, and an assembly line operator may mistakenly fail to assemble a ring to the piston 100. During further assembly of the piston and during assembly of the piston into a vehicle engine, the absence of one of the first compression ring 102 or the second compression ring 104 is relatively easy to determine visually. On the other hand, the absence of one of the first scraper ring 112, the second scraper ring 114, or the separator ring 116 of the oil ring assembly 106 is relatively hard to determine visually.

However, with the absence of any of these oil rings, the vehicle engine does not run properly. In addition, the absence of any these oil rings as the reason for improper operation of the vehicle engine is harder to determine once the vehicle engine is completely assembled. Furthermore, corrective action for the absence of any of these oil rings may be performed more easily if the absence of any these oil rings is detected during assembly of the piston and before the piston is assembled into the vehicle engine.

In light of the importance of the presence of all of the rings on the piston for proper operation of the vehicle engine, a mechanism is desired for automatically confirming the presence of all of at least one ring within a groove during assembly of the piston.

SUMMARY OF THE INVENTION

Accordingly, the present invention is a testing apparatus and method for automatically confirming the presence of all of at least one ring within a groove of an article of manufacture, such as a piston of a vehicle engine, during assembly of the article of manufacture. Generally, the present invention includes a test head having an opening with a first amount of air flow through the opening when the opening is not placed onto the groove of the article of manufacture. This opening of the test head is placed onto the groove of the article of manufacture resulting in a second amount of air flow through the opening. This second amount of air flow depends on the presence of each of the at least one ring within the groove. The present invention further includes a test head air pressure sensor, coupled to the opening of the test head, for measuring the second amount of air flow through the opening. If any of the rings within the groove of the article of manufacture is not present, then the extra space created within the groove by the absence of such a ring results in an increase in this second amount of air flow. A microcontroller, operatively coupled to the test head air pressure sensor, determines the absence of any of the at least one ring within the groove from this second amount of air flow through the opening as measured by the test head air pressure sensor.

In this manner, by using an air pressure sensor and a microcontroller, the absence of any of the at least one ring within the groove of the article of manufacture may be determined automatically during assembly of the article of manufacture. A alarm indication that a ring is not present within the groove of the article of manufacture is provided such that any action for correcting such an undesired situation may be performed during assembly of the article of manufacture.

In addition, the present invention includes calibration and monitoring mechanisms such that the opening of the test head is held on the groove of the article of manufacture with a proper force and to ensure a consistent amount of air flow through the opening of the test head when the test head is not placed onto the groove of the article of manufacture. Such calibration and monitoring mechanisms result in a reliable confirmation of the presence of all of the at least one ring within the groove of the article of manufacture.

These and other features and advantages of the present invention will be better understood by considering the following detailed description of the invention which is presented with the attached drawings.

DETAILED DESCRIPTION

The present invention will be described for confirming the presence of at least one ring within a groove of a piston of a vehicle engine during assembly of the piston. However, the present invention may be used for confirming the presence of at least one ring within a groove of any type of article of manufacture during the assembly of the article of manufacture, as would be apparent to one of ordinary skill in the art from the description herein.

Figure 1:
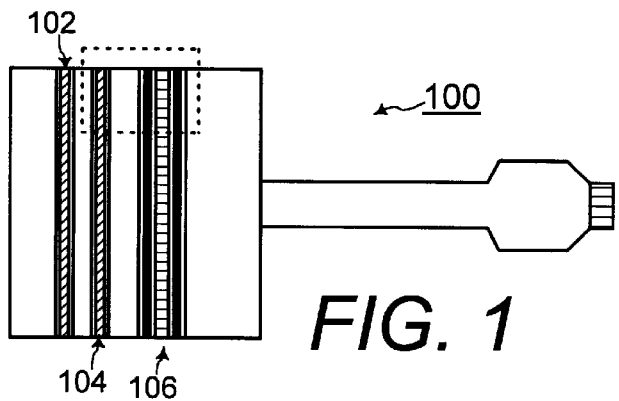
FIG. 1 shows a conventional piston, of a vehicle engine, including a plurality of rings assembled into grooves on the piston.
Figure 2:
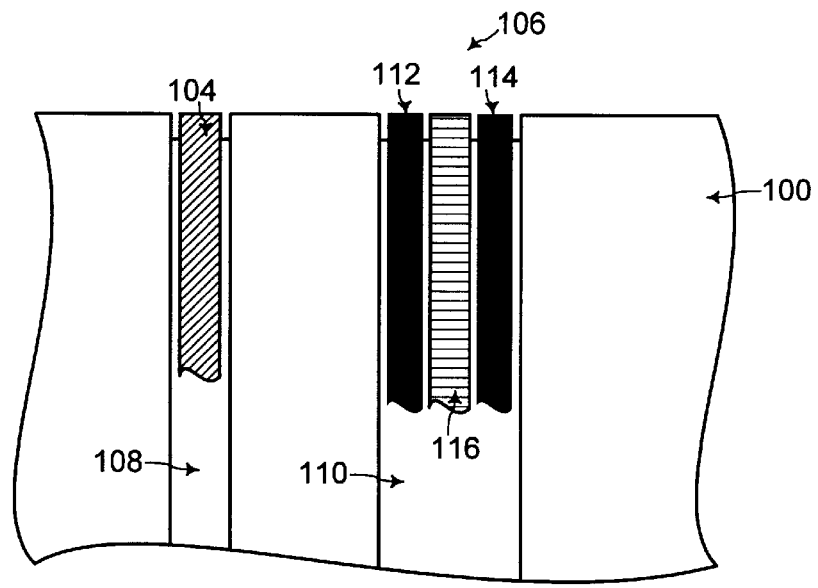
FIG. 2 shows an enlarged view of a compression ring assembled into one groove on the piston, and of an oil ring assembly, including two scraper rings and a separator ring, assembled into another groove on the piston.

Referring to FIG. 2, one of the functions of the compression ring 104 and the oil rings 112, 114, and 116 is to act as a seal within the combustion chamber of a vehicle engine, as known to one of ordinary skill in the art of vehicle system design. Thus, the gap between a ring and the wall of the groove having that ring assembled therein is designed within a predetermined tolerance. Referring to FIG. 2, for example, the space between the second compression ring 104 and the walls of the second groove 108 is consistent with the space between the first scraper ring 112 and the wall of the third groove 110 or with the space between the second scraper ring 114 and the wall of the third groove 110.

Figure 3:
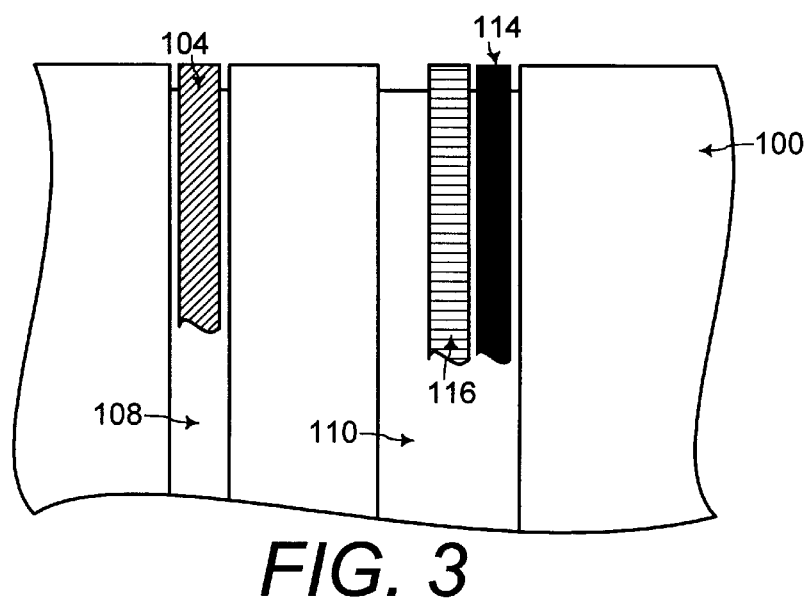
FIG. 3 shows the enlarged view of the compression ring and the oil ring assembly of FIG. 2 with one of the scraper rings being undesirably absent.

Because the gap between a ring and the wall of the groove having that ring assembled therein is consistent, if a ring is not present within the groove, the gap between the wall of the groove and another ring that is present is larger. Referring to FIG. 3 for example, the first scraper ring 112 is absent from the third groove 110. Thus, the gap between the wall of the third groove 110 and the separator ring 116 is considerably larger than the gap between the wall of the second groove 108 and the second compression ring 104. Within any groove, if any of the rings is absent, a relatively large gap of space is present within that groove.

Figure 4:
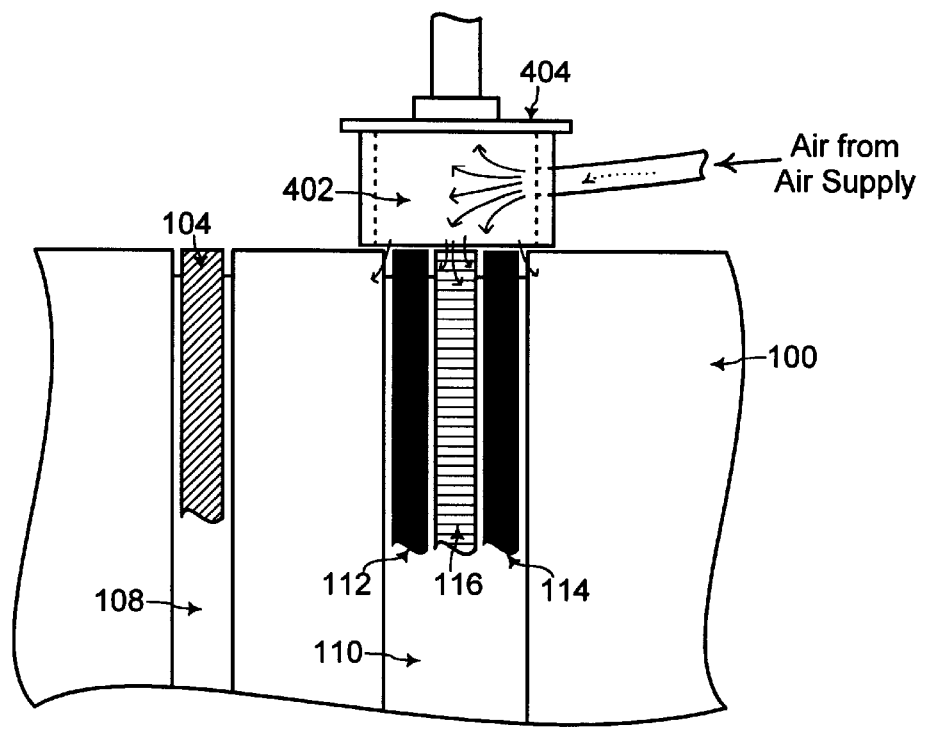
FIG. 4 shows placement of an opening of a test head onto the groove of the piston having all of the oil rings assembled therein, with air flow through the opening of the test head and through such a groove of the piston, according to an embodiment of the present invention.

The present invention applies air flow to a groove that is designed to have at least one ring assembled therein, and measures the resulting air flow through the groove to determine the presence of all of the at least one ring within the groove. Referring to FIG. 4, for example, an opening 402 of a test head 404 has a first amount of air flow through the opening 402 when the opening 402 is not placed on the third groove 110 of the piston 100. Air is provided to the opening 402 from an air supply source. The test head 404 is then lowered such that the opening 402 is placed on the third groove 110 of the piston 100 to result in a second amount of air flow through the opening 402 (as a result of air flow through the third groove 110).

The second amount of air flow through the opening 402 is constrained by the amount of air flow through the gaps between the oil rings within the third groove 110. Thus, the second amount of air flow through the opening 402 when the opening 402 is placed on the third groove 110 of the piston 100 is less then the first amount of air flow through the opening 402 and to the atmosphere when the opening 402 is not placed on the third groove 110 of the piston 100.

Figure 5:
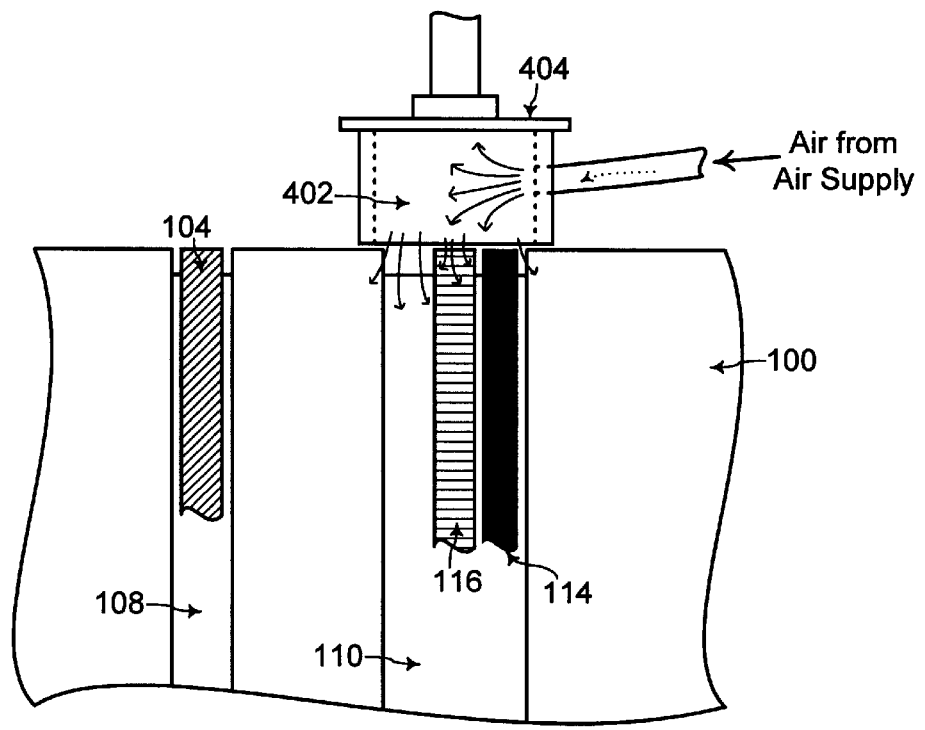
FIG. 5 shows placement of an opening of a test head onto the groove of the piston having one of the scraper rings undesirably absent, with air flow through the opening of the test head and through such a groove of the piston, according to an embodiment of the present invention.

Referring to FIG. 5, when any of the oil rings 112, 114, and 116 within the third groove 110 is absent, a larger gap of space is present within the third groove 110 resulting in a larger amount of air flow through such a groove 110. Thus, the second amount of air flow through the opening 402 when the opening 402 is placed on the third groove 110 of the piston 100 is larger when any of the oil rings 112, 114, and 116 is absent from the third groove 110 than when all of the oil rings 112, 114, and 116 is present within the third groove 110.

A testing apparatus of the present invention confirms the presence of all of at least one ring within a groove of an article of manufacture, such as a piston of a vehicle engine, by measuring the resulting amount of air flow through the opening 402 when the opening 402 is placed on the groove. The presence of all of the at least one ring within the groove results in a lower amount of air flow through the opening 402 when the opening 402 is placed on the groove. In contrast, the absence of any of the at least one ring within the groove results in a higher amount of air flow through the opening 402 when the opening 402 is placed on the groove.

Figure 6:
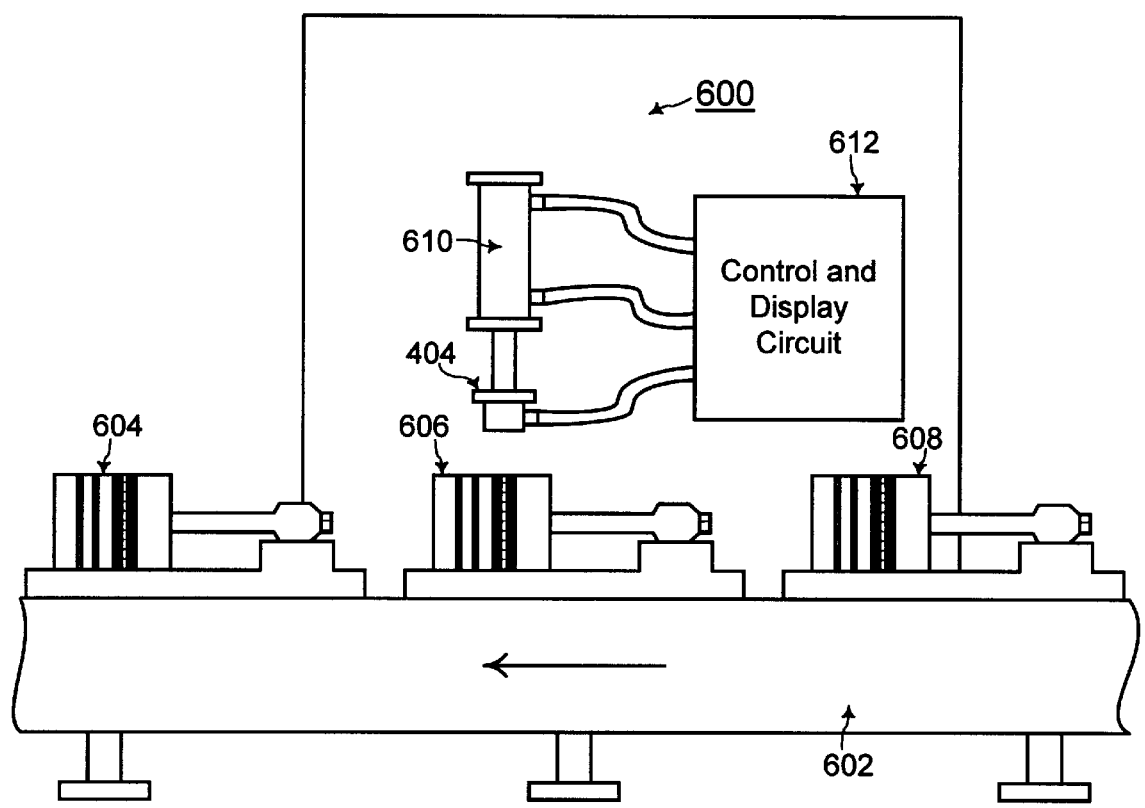
FIG. 6 shows a conveyor system for carrying pistons during assembly of the pistons and shows the position of a testing apparatus of the present invention within such an assembly line for manufacture of the pistons.

A testing apparatus of the present invention uses a microcontroller for automatically confirming the presence of all of at least one ring within a groove of an article of manufacture during assembly of the article of manufacture. Referring to FIG. 6, for example, a testing apparatus 600 of the present invention is disposed within an assembly line for manufacture of pistons of a vehicle engine. Such an assembly line includes a conveyor 602 which carries a plurality of pistons 604, 606, and 608 down the assembly line as components, such as the connecting rod, of the piston, are assembled into each of the pistons 604, 606, and 608. As the pistons 604, 606, and 608 move down the assembly line, each of the pistons 604, 606, and 608 stops at a fixed location under the test head 404 of the testing apparatus 600 of the present invention.

The testing apparatus 600 of the present invention includes a pneumatic cylinder 610 that raises the test head 404 and that lowers the test head 404 on a groove of a piston for confirming presence of all of at least one ring within that groove of the piston. A control and display circuit 612 of the testing apparatus 600 of the present invention includes a microcontroller for automatically confirming the presence of all of at least one ring within a groove of each of the pistons as these pistons move down the assembly line on the conveyor 602.

Figure 7:
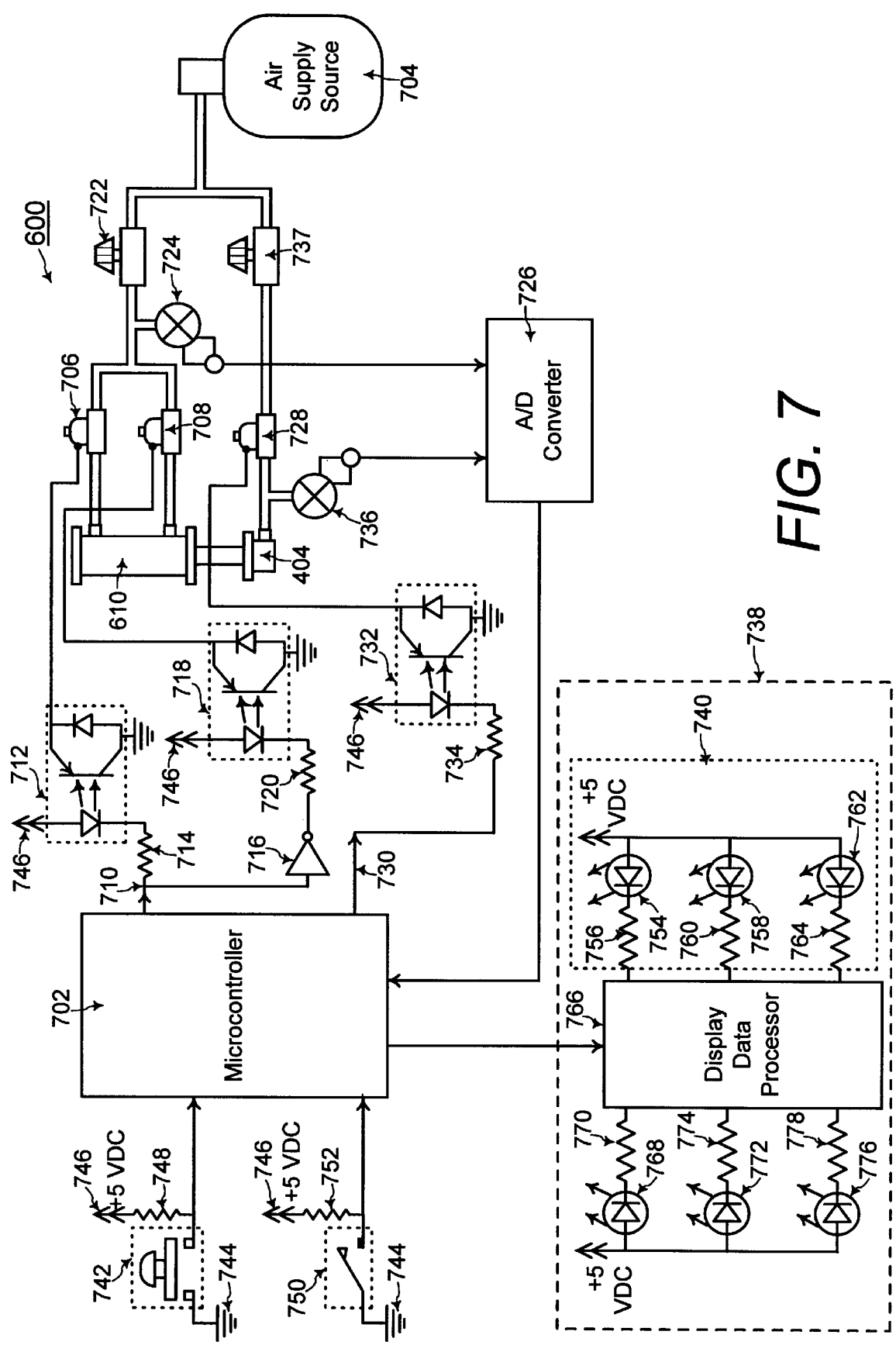
FIG. 7 shows components of a testing apparatus of the present invention for confirming the presence of all of at least one ring within a groove of an article of manufacture, such as a piston of a vehicle engine, during assembly of the article of manufacture.

Referring to FIG. 7, components of the testing apparatus 600 of the present invention are now described, and the operation of these components are described below herein with respect to a flow chart of FIG. 8. Referring to FIG. 7, the testing apparatus 600 of the present invention include a microcontroller 702. In addition, the testing apparatus 600 of the present invention includes the test head 404, having the opening 402 as shown in FIGS. 4 and 5, and the pneumatic cylinder 610 for lowering and raising the test head 404. Air is supplied to the opening 402 of the test head 404 and to the pneumatic cylinder 610 from an air supply source 704.

A first air control valve 706 is coupled to a top of the pneumatic cylinder 610, and the first air control valve 706 opens to allow air flow to the top of the pneumatic cylinder 610 when the pneumatic cylinder 610 lowers the test head 404. The first air control valve 706 is closed to prevent air flow to the top of the pneumatic cylinder 610 when the pneumatic cylinder 610 raises the test head 404.

A second air control valve 708 is coupled to a bottom of the pneumatic cylinder 610, and the second air control valve 708 opens to allow air flow to the bottom of the pneumatic cylinder 610 when the pneumatic cylinder 610 raises the test head 404. The second air control valve 708 is closed to prevent air flow to the bottom of the pneumatic cylinder 610 when the pneumatic cylinder 610 lowers the test head 404.

The pneumatic cylinder 610 is controlled by the microcontroller 702 to raise or lower the test head 404 via a pneumatic cylinder control signal line 710 from the microcontroller 702. This control signal line 710 is coupled to the first air control valve 706 via a first opto-isolator device 712. A first resistor 714 limits the current level through the first opto-isolator device 712. The first opto-isolator device 712 provides an optical coupling of the microcontroller 702 to the first air control valve 706 while electrically isolating any potentially high voltage at the first air control valve 706 from the microcontroller 702 to prevent damage to the microcontroller 702.

The pneumatic cylinder control signal line 710 from the microcontroller 702 is also coupled to the second air control valve 708 via an inverter 716 and a second opto-isolator device 718. A second resistor 720 limits the current level through the second opto-isolator device 718. The second opto-isolator device 718 provides an optical coupling of the microcontroller 702 to the second air control valve 708 while electrically isolating any potentially high voltages at the second air control valve 708 from the microcontroller 702 to prevent damage to the microcontroller 702.

When a low voltage is sent from the microcontroller 702 on the pneumatic cylinder control signal line 710, the first opto-isolator device 712 turns on to open the first air control valve 706, and the second opto-isolator device 718 turns off to close the second air control valve 708. In this manner, the pneumatic cylinder 610 is controlled by the microcontroller 702 to lower the test head 404 such that the opening 402 of the test head 404 is placed on a groove of the article of manufacture as shown in FIGS. 4 and 5.

When a high voltage is sent from the microcontroller 702 on the pneumatic cylinder control signal line 710, the first opto-isolator device 712 turns off to close the first air control valve 706, and the second opto-isolator device 718 turns on to open the second air control valve 708. In this manner, the pneumatic cylinder 610 is controlled by the microcontroller 702 to raise the test head 404 such that the opening 402 of the test head 404 is not placed on the groove of the article of manufacture. Note that the inverter 716 allows control of both the first air control valve 706 via the first opto-isolator device 712 and the second air control valve 708 via the second opto-isolator device 718 with the one pneumatic cylinder control signal line 710.

A pneumatic cylinder air regulator 722 is coupled to the first air control valve 706, the second air control valve 708, and the air supply source 704. The pneumatic cylinder air regulator 722 is adjusted to affect the amount of air flow to the pneumatic cylinder 610 from the air supply source 704.

The testing apparatus of the present invention also includes a pneumatic cylinder air pressure sensor 724 for measuring the air pressure from the air flow through the pneumatic cylinder 610. The pneumatic cylinder air pressure sensor 724 is an air pressure transducer that provides an analog voltage that is proportional to the air pressure from the air flow through the pneumatic cylinder 610. This analog voltage from the pneumatic cylinder air pressure sensor 724 is input to an analog-to-digital converter 726, and a digital valve of such a voltage is provided to the microcontroller 702.

The testing apparatus of the present invention further includes a third air control valve 728 coupled to the opening 402 of the test head 404. The third air control valve 728 opens to allow air flow through the opening 402 from the air supply source 704 and closes to prevent air flow through the opening 402 from the air supply source 704. The third air control valve 728 is controlled by the microcontroller 702 via a test head control signal line 730 from the microcontroller 702. This control signal line 730 is coupled to the third air control valve 728 via a third opto-isolator device 732. A third resistor 734 limits the current level through the third opto-isolator device 732. The third opto-isolator device 732 provides an optical coupling of the microcontroller 702 to the third air control valve 728 while electrically isolating any potentially high voltage at the third air control valve 728 from the microcontroller 702 to prevent damage to the microcontroller 702.

The microcontroller 702 sends a low voltage on the test head control signal line 730 to turn on the third opto-isolator device 732 and thus to open the third air control valve 728 to allow air flow through the opening 402 of the test head 404. Alternatively, the microcontroller 702 sends a high voltage on the test head control signal line 730 to turn off the third opto-isolator device 732 and thus to close the third air control valve 728 to prevent air flow through the opening 402 of the test head 404.

Additionally, the testing apparatus 600 of the present invention includes a test head air pressure sensor 736 for measuring the air pressure from the air flow through the opening 402 of the test head 404. The test head air pressure sensor 736 is an air pressure transducer that provides an analog voltage that is proportional to the air pressure from the air flow through the opening 402 of the test head 404. This analog voltage from the test head air pressure sensor 736 is input to the analog-to-digital converter 726, and a digital value of such a voltage is provided to the microcontroller 702.

Referring to FIGS. 4 and 5, with a smaller amount of air flow through the opening 402 of the test head 404 when all of the rings within a groove are present (as shown in FIG. 4), a larger air pressure is measured by the test head air pressure sensor 736. In contrast, with a larger amount of air flow through the opening 402 of the test head 404 with any of the rings within a groove being absent (as shown in FIG. 5), a smaller air pressure is measured by the test head air pressure sensor 736.

A test head air regulator 737 is coupled between the third air control valve 728 and the air supply source 704. The test head air regulator 737 is adjusted to affect the amount of air flow through the opening 402 of the test head 404 from the air supply source 704.

The microcontroller 702 controls a display unit 738 to provide a first indication when the microcontroller 702 determines that all of the at least one ring is present within a groove, and to provide a second indication (i.e., an alarm indication) when the microcontroller 702 determines that any of the at least one ring is absent from the groove. In addition, the display unit 738 includes a calibration display unit 740 used during calibration of the amount of air flow through the pneumatic cylinder 610 from the air supply source 704 and during calibration of the amount of air flow through the opening 402 of the test head 404 from the air supply source 704.

A start switch 742 is coupled between the microcontroller 702 and a ground node 744. When the start switch 742 is not closed, the microcontroller 702 is coupled to a supply voltage 746 via a fourth resistor 748. When the start switch 742 is closed, the microcontroller 702 is coupled to the ground node 744 indicating that the testing apparatus 600 of the present invention may start the automated confirmation of the presence of all of at least one ring within a groove of an article of manufacture.

A calibration switch 750 is coupled between the microcontroller 702 and the ground node 744. When the calibration switch 750 is not closed, the microcontroller 702 is coupled to the supply voltage 746 via a fifth resistor 752. When the calibration switch 750 is closed, the microcontroller 702 is coupled to the ground node 744 indicating that the microcontroller 702 of the testing apparatus 600 may operate in a calibration mode.

A detailed description of the operation of the testing apparatus 600 of the present invention is now described with reference to the flowchart of FIG. 8. The microcontroller 702 controls the operation of the testing apparatus 600, and FIG. 8 shows the flowchart of the software running on the microcontroller 702 for controlling the operation of the testing apparatus 600. The microcontroller 702 may be any type of programmable data processing device as known to one of ordinary skill in the art, such as PLD's (Programmable Logic Devices) or any other type of such data processors. The microcontroller 702 may then be programmed to operate in accordance with the flowchart of FIG. 8.

Figure 8:
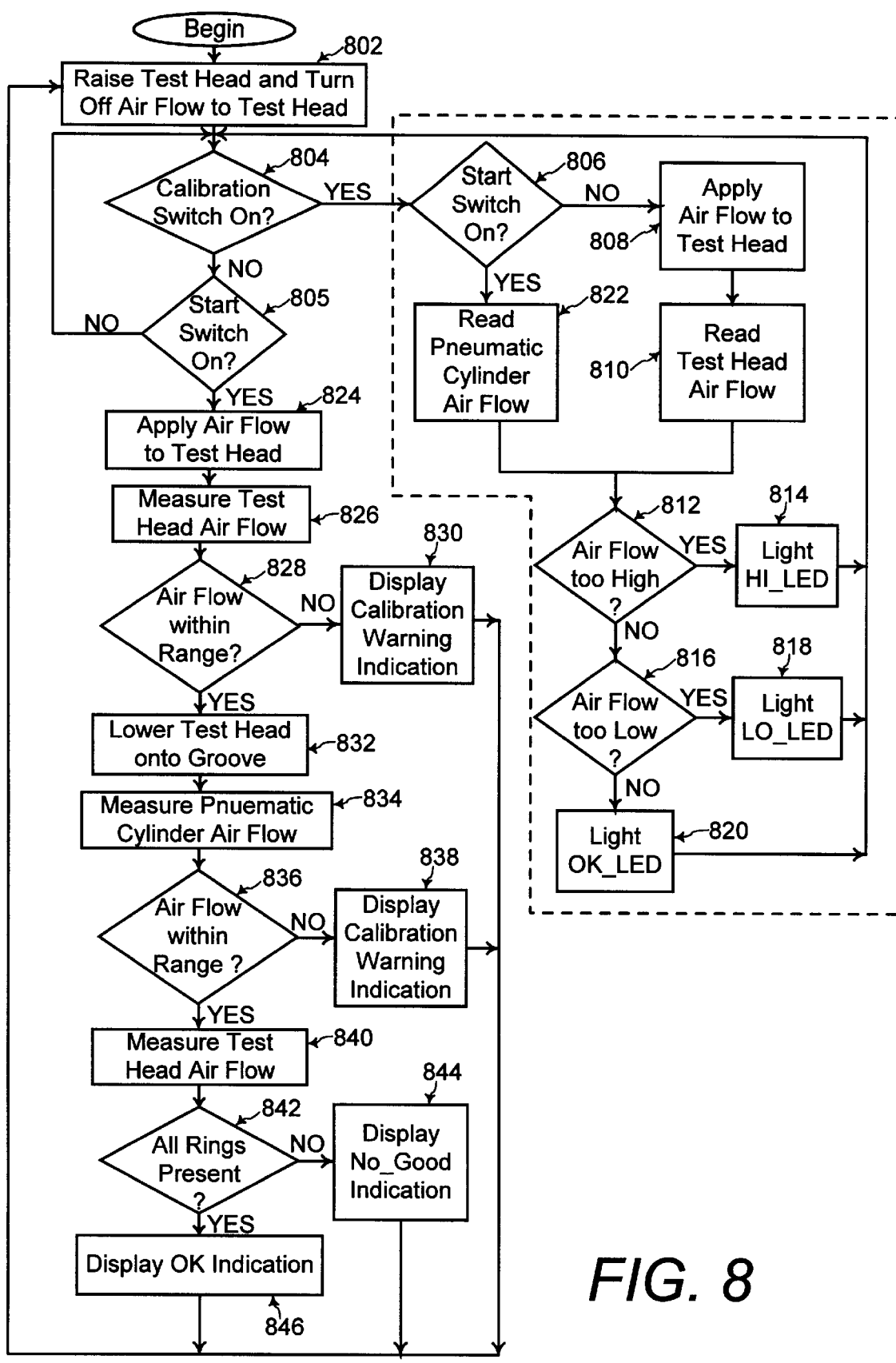
FIG. 8 shows a flowchart of the software programmed within the microcontroller of FIG. 7 for controlling the operation of the testing apparatus of FIG. 7, according to an embodiment of the present invention.

Referring to FIGS. 7 and 8, at the beginning of the operation of the testing apparatus 600 of the present invention, any variables used by the microcontroller 702 are initialized, and the test head 404 is in a raised position (step 802 in FIG. 8). In addition the microcontroller 702 controls the third air control valve 728 to be closed to prevent air flow through the opening 402 of the test head 404 from the air supply source 704 (step 802 in FIG. 8).

The microcontroller 702 then monitors whether the calibration switch 750 is closed (step 804 in FIG. 8). The calibration switch 750 is closed to notify the microcontroller 702 that the testing apparatus 600 is to operate in the calibration mode for calibrating the amount of air flow through the opening 402 of the test head 404 when the test head 404 is not placed onto the groove of the article of manufacture or for calibrating the amount of air flow to the pneumatic cylinder 610 from the air supply source 704.

If the calibration switch 750 is not closed, then the microcontroller 702 checks to determine whether the start switch 742 is closed (step 805 of FIG. 8). The start switch 742 is closed to indicate to the microcontroller 706 that the testing apparatus 600 of the present invention may begin the process for confirming the presence of all of at least one ring within a groove of an article of manufacture. If the calibration switch 750 is not closed and the start switch 742 is not closed, the microcontroller 702 returns back to step 804 and loops through steps 804 and 805 to monitor when either one of the calibration switch 750 or the start switch 742 is closed.

If the calibration switch 750 is closed, then the microcontroller 702 determines whether the start switch 742 is also closed (step 806 of FIG. 8). If the start switch 742 is not also closed, then the microcontroller is notified that the amount of air flow through the opening 402 of the test head 404 from the air supply source 704 is being calibrated, when the opening 402 of the test head 404 is not placed onto the groove of the article of manufacture. Thus, the calibration switch 750 being closed and the start switch 742 not being closed act as a test head calibration indicator.

On the other hand, if the calibration switch 750 is closed and if the start switch 742 is also closed, then the microcontroller is notified that the amount of air flow through the pneumatic cylinder 610 from the air supply source 704 is being calibrated. Thus, the calibration switch 750 being closed and the start switch 742 also being closed act as a pneumatic cylinder calibration indicator. This amount of air flow through the pneumatic cylinder 610 determines the force with which the pneumatic cylinder 610 holds the test head 404 to the groove of the article of manufacture when the test head 404 is lowered.

When the calibration switch 750 is closed and the start switch 742 is not closed, the microcontroller 702 controls the third air control valve 728 to open to allow air flow through the opening 402 of the test head 404 from the air supply source 704 while the test head 404 is in a raised position (step 808 of FIG. 8). The microcontroller 702 then reads the digital value from the analog-to-digital converter 726 of the analog voltage from the test head air pressure sensor 736 (step 810 of FIG. 8). This digital value is proportional to the first amount of air flow through the opening 402 of the test head 404 when the test head 404 is in a raised position.

This first amount of air flow is desired to be within a proper range, and the microcontroller 702 determines whether this first amount of air flow as measured by the test head air pressure sensor 736 is within the proper range. If this first amount of air flow as measured by the test head air pressure sensor 736 is above the proper range (step 812 of FIG. 8), the microcontroller 702 controls a first LED (a HI_LED) 754 of the calibration display unit 740 to light (step 814 of FIG. 8). A sixth resistor 756 limits the current level through the first LED 754. If this first amount of air flow as measured by the test head air pressure sensor 736 is below the proper range (step 816 of FIG. 8), the microcontroller 702 controls a second LED (a LO_LED) 758 of the calibration display unit 740 to light (step 818 of FIG. 8). A seventh resistor 760 limits the current level through the second LED 758. If this first amount of air flow as measured by the test head air pressure sensor 736 is within the proper range, the microcontroller 702 controls a third LED (an OK_LED) 762 of the calibration display unit 740 to light (step 820 of FIG. 8). An eighth resistor 764 limits the current level through the third LED 762. The microcontroller 702 sends appropriate control signals to a display data processor 766 for turning on the appropriate one of the first LED 754, the second LED 758, and the third LED 762.

During calibration of this first amount of air flow through the opening 402 of the test head 404 while the test head 404 is in a raised position, if the first LED 754 lights, then the test head air flow regulator 737 is adjusted to decrease the first amount of air flow through the opening 402 of the test head 404 from the air supply source 704. The test head air flow regulator 737 is thus adjusted until the first LED 754 turns off and the third LED 762 turns on to indicate that the first amount of air flow through the opening 402 of the test head 404 is within the proper range. The test head air flow regulator 737 may be adjusted manually by an operator or automatically by electronic control of the test head air flow regulator 737.

Similarly, during calibration of this first amount of air flow through the opening 402 of the test head 404 while the test head is in a raised position, if the second LED 758 lights, then the test head air flow regulator 737 is adjusted to increase the first amount of air flow through the opening 402 of the test head 404 from the air supply source 704. The test head air flow regulator 737 is thus adjusted until the second LED 758 turns off and the third LED 762 turns on to indicate that the first amount of air flow through the opening 402 of the test head 404 is within the proper range. The test head air flow regulator 737 may be adjusted manually by an operator or automatically by electronic control of the test head air flow regulator 737.

When the first amount of air flow through the opening 402 of the test head 404, while the test head is in a raised position, is within the proper range with the third LED 762 being lighted, this first amount of air flow through the opening 402 of the test head 404 is properly calibrated. The microcontroller 702 then returns back to step 804 and loops through steps 804 and 805 to monitor when either one of the calibration switch 750 or the start switch 742 is closed.

If the calibration switch 750 is closed and the start switch 742 is also closed, then the microcontroller 702 is notified that the amount of air flow through the pneumatic cylinder 610 from the air supply source 704 is being calibrated. In that case, the microcontroller reads the digital value from the analog-to-digital converter 726 of the analog voltage from the pneumatic cylinder air pressure sensor 724 (step 822 of FIG. 8). This digital value is proportional to the amount of air flow through the pneumatic cylinder 610.

This amount of air flow through the pneumatic cylinder 610 is desired to be within a proper range such that the pneumatic cylinder 610 holds the test head 404 to a groove of an article of manufacture with a proper force when the pneumatic cylinder 610 lowers the test head 404. The microcontroller determines whether this air flow through the pneumatic cylinder 610 as measured by the pneumatic cylinder air pressure sensor 724 is within the proper range. If this amount of air flow as measured by the pneumatic cylinder air pressure sensor 724 is above the proper range (step 812 of FIG. 8), the microcontroller 702 controls the first LED 754 of the calibration display unit 740 to light (step 814 of FIG. 8). If this amount of air flow as measured by the pneumatic cylinder air pressure sensor 724 is below the proper range (step 816 of FIG. 8), the microcontroller 702 controls the second LED 758 of the calibration display unit 740 to light (step 818 of FIG. 8). If this amount of air flow as measured by the pneumatic cylinder air pressure sensor 724 is within the proper range, the microcontroller 702 controls the third LED 762 of the calibration display unit 740 to light (step 820 of FIG. 8).

During calibration of this amount of air flow through the pneumatic cylinder 610, if the first LED 754 lights, then the pneumatic cylinder air flow regulator 722 is adjusted to decrease the amount of air flow through the pneumatic cylinder 610 from the air supply source 704. The pneumatic cylinder air flow regulator 722 is adjusted until the first LED 754 turns off and the third LED 762 turns on to indicate that the amount of air flow through the pneumatic cylinder 610 is within the proper range. The pneumatic cylinder air flow regulator 722 may be adjusted manually by an operator or automatically by electronic control of the pneumatic cylinder air flow regulator 722.

Similarly, during calibration of the amount of air flow through the pneumatic cylinder, if the second LED 758 lights, then the pneumatic cylinder air flow regulator 722 is adjusted to increase the amount of air flow through the pneumatic cylinder 610 from the air supply source. The pneumatic cylinder air flow regulator 722 is thus adjusted until the second LED 758 turns off and the third LED 762 turns on to indicate that the amount of air flow through the pneumatic cylinder 610 is within the proper range. The pneumatic cylinder air flow regulator 722 may be adjusted manually by an operator or automatically by electronic control of the pneumatic cylinder air flow regulator 722.

When the amount of air flow through the pneumatic cylinder 610 is within the proper range with the third LED 762 being lighted, this amount of air flow through the pneumatic cylinder 610 is properly calibrated. The microcontroller 702 then returns back to step 804 and loops through steps 804 and 805 to monitor when either one of the calibration switch 750 or the start switch 742 is closed. Note that the steps performed during the calibration mode of the present invention are shown within the dashed lines in FIG. 8.

Referring to FIG. 8, when the calibration switch 750 is not closed and when the start switch 742 is closed, the microcontroller 702 begins the confirmation of the presence of all of at least one ring within a groove of an article of manufacture. The microcontroller 702 opens the third air control valve 728 to allow air flow through the opening 402 of the test head 404 from the air supply source 704 while the test head 404 is in a raised position with the opening 402 not placed on the groove of the article of manufacture (step 824 of FIG. 8).

While the test head 404 is still in the raised position, the microcontroller 702 checks to ensure that the first amount of air flow through the opening 402 of the test head 404 is properly calibrated to be within a proper range. The microcontroller 702 reads the digital value from the analog-to-digital converter 726 of the analog voltage from the test head air pressure sensor 736 (step 826 of FIG. 8). This digital value is proportional to the first amount of air flow through the opening 402 of the test head 404 when the test head 404 is in the raised position. This first amount of air flow is within the proper range if properly calibrated, and the microcontroller determines whether this first amount of air flow as measured by the test head pressure sensor 736 is within the proper range (step 828 of FIG. 8).

If this first amount of air flow is not within the proper range, the microcontroller 702 sends appropriate control signals to the display data processor 766 of the display unit 738 to provide a warning indication (step 830 of FIG. 8). For example, a fourth LED 768 of the display unit 738 is controlled to flash as such a warning indication, and additionally, an audible alarm may be provided. A ninth resistor 770 limits the current level through the fourth LED 768. Because this first amount of air flow through the opening 402 of the test head 404 is not properly calibrated, the microcontroller does not continue with the steps for confirming the presence of the at least one ring within the groove of the article of manufacture. Thus, after providing the warning indication, the microcontroller 702 returns back to step 802 and then loops through steps 804 and 805 to monitor when either one of the calibration switch 750 or the start switch 742 is closed.

On the other hand, if this first amount of air flow through the opening 402 of the test head 404 is determined to be within the proper range with proper calibration, the microcontroller 702 continues with the steps for confirming the presence of the at least one ring within the groove of the article of manufacture. Thus, the microcontroller 702 stores the digital value of the voltage indicating this first amount of air flow through the opening 402 of the test head 404. In addition, the microcontroller then controls the pneumatic cylinder 610 via the first air control valve 706 and the second air control valve 708 to lower the test head 404 such that the opening 402 of the test head 404 is placed on the groove of the article of manufacture as illustrated in FIG. 4 or 5 (step 832 of FIG. 8).

When the test head 404 is lowered on the groove of the article of manufacture, the microcontroller 702 checks to ensure that the amount of air flow through the pneumatic cylinder 610 is properly calibrated to be within a proper range such that the pneumatic cylinder 610 holds the test head 404 to the groove of the article of manufacture with a proper force. The microcontroller 702 then reads the digital value from the analog-to-digital converter 726 of the analog voltage from the pneumatic cylinder air pressure sensor 724 (step 834 of FIG. 8). This digital value is proportional to the amount of air flow through the pneumatic cylinder 610. This amount of air flow is within the proper range if properly calibrated, and the microcontroller determines whether this amount of air flow as measured by the pneumatic cylinder air pressure sensor 724 is within the proper range (step 836 of FIG. 8).

If this amount of air flow through the pneumatic cylinder 610 is not within the proper range, then the microcontroller determines that the pneumatic cylinder 610 is not holding the test head 404 on the groove of the article of manufacture with proper force. In that case, the microcontroller 702 sends appropriate control signals to the display data processor 766 of the display unit 738 to provide a warning indication (step 838 of FIG. 8). For example, the fourth LED 768 of the display unit 738 is controlled to flash as such a warning indication, and additionally, an audible alarm may be provided. Furthermore, because this amount of air flow through the pneumatic cylinder 610 is not properly calibrated, the microcontroller does not continue with the steps for confirming the presence of the at least one ring within the groove of the article of manufacture. Thus, after providing the warning indication, the microcontroller 702 returns back to step 802 and then loops through steps 804 and 805 to monitor when either one of the calibration switch 750 or the start switch 742 is closed.

On the other hand, if this amount of air flow through the pneumatic cylinder 610 is determined to be within the proper range with proper calibration, the microcontroller 702 continues with the steps for confirming the presence of the at least one ring within the groove of the article of manufacture. Thus, the microcontroller 702 reads the digital value from the analog-to-digital converter 726 of the analog voltage from the test head air pressure sensor 736 (step 840 of FIG. 8). This digital value is proportional to a second amount of air flow through the opening 402 of the test head 404 when the test head 404 is lowered with the opening 402 placed on the groove of the article of manufacture as illustrated in FIGS. 4 and 5.

Referring to FIGS. 4 and 5, this second amount of air flow through the opening 402 depends on the presence of all of the at least one ring within the groove of the article of manufacture. Referring to FIG. 5, when any of the oil rings 112, 114, and 116 within the third groove 110 is absent, a larger gap of space is present within the third groove 110 resulting in an increase in the amount of air flow through such a groove 110 and in an increase in the second amount of air flow through the opening 402 of the test head 404. The voltage measured by the test head air pressure sensor 736 is proportional to the amount of air flow through the opening 402 of the test head 404.

The microcontroller 702 determines whether all of the at least one ring within the groove of the article of manufacture is present within the groove from the digital value of the voltage indicating this second amount of air flow through the opening 402 when the test head 404 is lowered on the groove (step 842 of FIG. 8). The microcontroller 702 may additionally use the digital value of the voltage indicating the first amount of air flow through the opening 402 of the test head 404 when the test head 404 is not lowered on the groove, during this determination of the presence of all of the at least one ring within the groove.

If the microcontroller 702 determines that any of the at least one ring is not present within the groove of the article of manufacture, the microcontroller 702 sends appropriate control signals to the display data processor 766 of the display unit 738 to provide a "No_Good" indication (step 844 of FIG. 8). For example, the fourth LED 768 of the display unit 738 is controlled to light as such a "No_Good" indication.

At this point, the microcontroller 702 has then completed the confirmation of the presence of the at least one ring within the groove of this particular article of manufacture, and the microcontroller returns to step 802 to control the pneumatic cylinder 610 to raise the test head 404 and to close the third air control valve 728 to prevent air flow through the opening 402 of the test head 404 from the air supply source 704. In addition, the microcontroller 702 may send appropriate control signals to the display data processor 766 of the display unit 738 to provide a "Ready" indication to notify an operator that the testing apparatus 600 of the present invention is ready to begin confirming the presence of at least one ring within another groove of the article of manufacture, or within a groove of another article of manufacture. For example, a fifth LED 772 of the display unit 738 may be controlled to light as the "Ready" indication. A tenth resistor 774 limits the current level through the fifth LED 772.

Alternatively, if the microcontroller 702 determines that all of the at least one ring is present within the groove of the article of manufacture, the microcontroller 702 sends appropriate control signals to the display data processor 766 of the display unit 738 to provide an "OK" indication (step 846 of FIG. 8). For example, a sixth LED 776 of the display unit 738 is controlled to light as such an "OK" indication. An eleventh resistor 778 limits the current level through the sixth LED 776.

At this point also, the microcontroller 702 has then completed the confirmation of the presence of the at least one ring within the groove of this particular article of manufacture, and the microcontroller returns to step 802 to control the pneumatic cylinder 610 to raise the test head 404 and to close the third air control valve 728 to prevent air flow through the opening 402 of the test head 404 from the air supply source 704. In addition, the microcontroller 702 may send appropriate control signals to the display data processor 766 of the display unit 738 to provide the "Ready" indication to notify an operator that the testing apparatus 600 of the present invention is ready to begin confirming the presence of at least one ring within another groove of the article of manufacture or within a groove of another article of manufacture. For example, the fifth LED 772 of the display unit 738 may be controlled to light as the "Ready" indication.

In this manner, the testing apparatus 600 of the present invention automatically confirms the presence of all of at least one ring within a groove of an article of manufacture during assembly of the article of manufacture. The testing apparatus 600 of the present invention includes a microcontroller that controls the components of the testing apparatus 600 to automatically provide an alarm indication if any of the at least one ring is absent from the groove of the article of manufacture. With such an alarm indication, corrective measures may be taken to include the missing ring into the groove of the article of manufacture during assembly of the article of manufacture.

In addition, the use of the microcontroller 702 is amenable for calibration of the components in the testing apparatus 600 of the present invention and for monitoring for proper calibration of such components. Such calibration and monitoring by the microcontroller 702 results in reliable confirmation of the presence of all of the at least one ring within the groove of the article of manufacture.

The foregoing is by way of example only and is not intended to be limiting. For example, the present invention has been described for confirming the presence of at least one ring within a groove of a piston of a vehicle engine during assembly of the piston. However, the present invention may be used for confirming the presence of at least one ring within a groove of any type of article of manufacture, as would be apparent to one of ordinary skill in the art from the description herein. Furthermore, the present invention may be used for confirming the presence of any number of rings within the groove of the article of manufacture, aside from the example illustrated in FIGS. 4 and 5, as would be apparent to one of ordinary skill in the art from the description herein.

Figure 9:
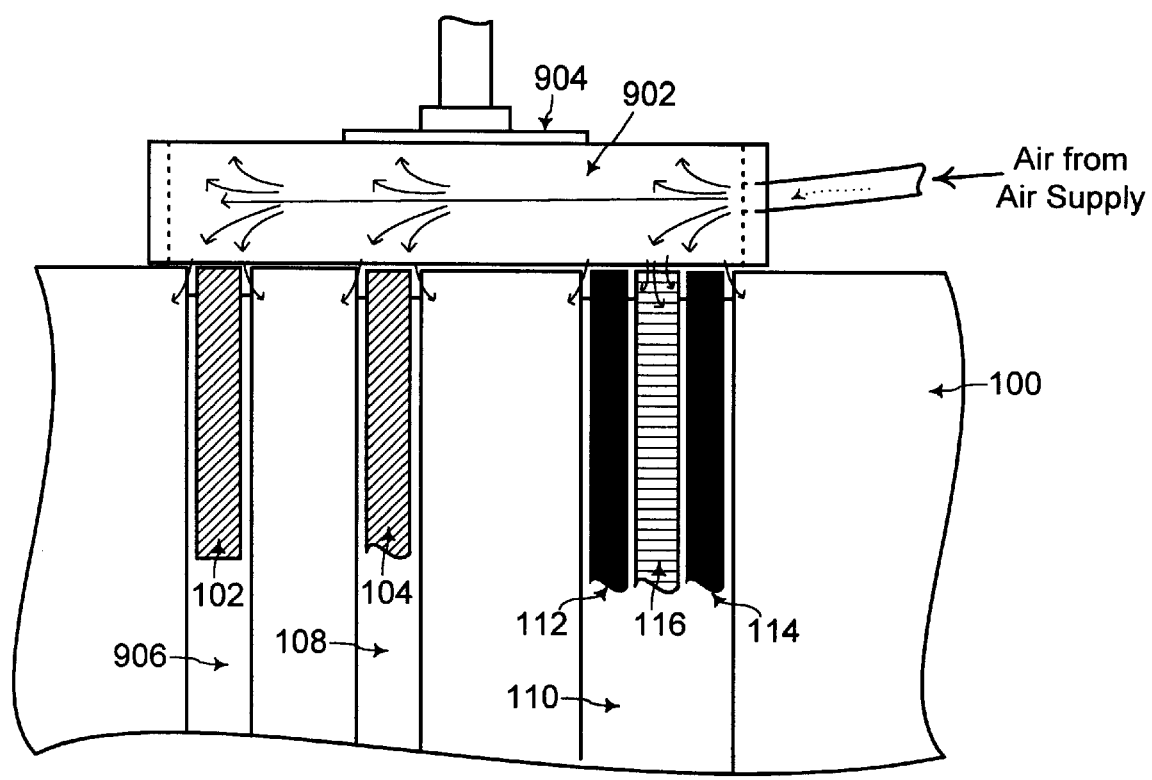
FIG. 9 shows placement of a larger opening of a larger test head onto a plurality of grooves of the piston for detecting the presence of each ring within the plurality of grooves of the piston, according to another embodiment of the present invention The figures referred to herein are drawn for clarity of illustration and are not necessarily drawn to scale. Elements having the same reference number in FIGS. 1, 2, 3, 4, 5, 6, 7, 8, and 9 refer to elements having similar structure and function.

In addition, the present invention may be used to determine the presence of at least one ring within each of a plurality of grooves of an article of manufacture. Referring to FIG. 9, for example, a larger opening 902 of a larger test head 904 extends over the first groove 906 designed for holding the first compression ring 102, the second groove 108 designed for holding the second compression ring 104, and the third groove 110 designed for holding the first scraper ring 112, the second scraper ring 114, and the separator ring 116. In this case, a "No_Good" indication is generated by the testing apparatus 600 of the present invention when any of the rings 102, 104, 112, 114, and 116 is missing from any of the grooves 906, 108, and 110.

The present invention is limited only as defined in the following claims and equivalents thereof.

I claim:

1. A testing apparatus for confirming presence of all of at least one ring within a groove of an article of manufacture during assembly of said article of manufacture, the testing apparatus comprising:

a test head having an opening with a first amount of air flow through said opening when said opening is not placed onto said groove of said article of manufacture; and wherein said opening of said test head is placed onto said groove of said article of manufacture resulting in a second amount of air flow through said opening, and wherein said second amount of air flow depends on the presence of each of said at least one ring within said groove;

a test head air pressure sensor, coupled to said opening of said test head, for measuring said second amount of air flow through said opening; and a microcontroller, operatively coupled to said test head air pressure sensor, for determining the presence of all of said at least one ring within said groove from said second amount of air flow through said opening as measured by said test head air pressure sensor.

2. The testing apparatus of claim 1, further comprising:

a display unit, operatively coupled to said microcontroller, for providing a first indication when the microcontroller determines that all of said at least one ring is present within said groove, and for providing a second indication when the microcontroller determines that any of said at least one ring is not present within said groove.

3. The testing apparatus of claim 1, further comprising:

a pneumatic cylinder, coupled to said test head, for lowering said test head such that said opening is placed onto said groove of said article of manufacture, and for raising said test head after said test head air pressure sensor measures said second amount of air flow through said opening;

a first air control valve, coupled to a top of said pneumatic cylinder, that opens when said test head is lowered and that closes when said test head is raised; and a second air control valve, coupled to a bottom of said pneumatic cylinder, that closes when said test head is lowered and that opens when said test head is raised;

and wherein said microcontroller controls said pneumatic cylinder to lower said test head by opening said first air control valve and by closing said second air control valve, and to raise said test head by closing said first air control valve and by opening said second air control valve.

4. The testing apparatus of claim 3, further comprising:

a pneumatic cylinder air flow regulator, coupled to said first air control valve and said second air control valve and to an air supply source, for controlling air flow to said pneumatic cylinder from said air supply source; and a pneumatic cylinder air pressure sensor, coupled to said first air control valve and to said second air control valve, for measuring an amount of air flow through said pneumatic cylinder.

5. The testing apparatus of claim 4, wherein said microcontroller determines, whether said pneumatic cylinder is holding said test head on said groove with a proper force, from said amount of air flow through said pneumatic cylinder as measured by said pneumatic cylinder air pressure sensor, and wherein said testing apparatus further comprises:

a display unit, operatively coupled to said microcontroller, for providing a warning indication when the microcontroller determines that said pneumatic cylinder is not holding said test head on said groove with said proper force.

6. The testing apparatus of claim 4, further comprising:

a pneumatic cylinder calibration indicator, coupled to said microcontroller, for notifying the microcontroller that said amount of air flow through the pneumatic cylinder is being calibrated;

and wherein said microcontroller determines whether said amount of air flow through said pneumatic cylinder, as measured by said pneumatic cylinder air pressure sensor, is with a proper range; and a calibration display unit further including:
- a first LED that is controlled by said microcontroller to light when said amount of air flow through said pneumatic cylinder, as measured by said pneumatic cylinder air pressure sensor, is above said proper range;
- a second LED that is controlled by said microcontroller to light when said amount of air flow through said pneumatic cylinder, as measured by said pneumatic cylinder air pressure sensor, is below said proper range; and
- a third LED that is controlled by said microcontroller to light when said amount of air flow through said pneumatic cylinder, as measured by said pneumatic cylinder air pressure sensor, is within said proper range;

and wherein said pneumatic cylinder air flow regulator is adjusted to increase said amount of air flow through said pneumatic cylinder when said second LED lights, until said second LED turns off and said third LED lights;

and wherein said pneumatic cylinder air flow regulator is adjusted to decrease said amount of air flow through said pneumatic cylinder when said first LED lights, until said first LED turns off and said third LED lights.

7. The testing apparatus of claim 1, wherein said test head air pressure sensor measures said first amount of air flow through said opening of said test head when said test head is not lowered on said groove, and wherein said microcontroller determines whether said first amount of air flow through said opening of said test head is properly calibrated, and wherein said testing apparatus further comprises:
- a display unit, operatively coupled to said microcontroller, for providing a warning indication when the microcontroller determines that said first amount of air flow through said opening of said test head is not properly calibrated.

8. The testing apparatus of claim 1, further comprising:
- a test head calibration indicator, coupled to said microcontroller, for notifying the microcontroller that said first amount of air flow through said opening of said test head is being calibrated when said test head is not lowered on said groove of said article of manufacture;

and wherein said microcontroller determines whether said first amount of air flow through said opening of said test head, as measured by said test head air pressure sensor, is within a proper range;

- a calibration display unit further including:
  - a first LED that is controlled by said microcontroller to light when said first amount of air flow through said opening of said test head, as measured by said test head air pressure sensor, is above said proper range;
  - a second LED that is controlled by said microcontroller to light when said first amount of air flow through said opening of said test head, as measured by said test head air pressure sensor, is below said proper range; and
  - a third LED that is controlled by said microcontroller to light when said first amount of air flow through said opening of said test head, as measured by said test head air pressure sensor, is within said proper range; and
- a test head air flow regulator, coupled to said opening of said test head and an air supply source, for controlling air flow to said opening of said test head from said air supply source;

and wherein said test head air flow regulator is adjusted to increase said first amount of air flow through said opening of said test head when said second LED lights, until said second LED turns off and said third LED lights;

and wherein said test head air flow regulator is adjusted to decrease said first amount of air flow through said opening of said test head when said first LED lights, until said first LED turns off and said third LED lights.

9. The testing apparatus of claim 1, wherein said at least one ring is assembled within a groove of a piston of a vehicle engine.

10. The testing apparatus of claim 1, wherein said testing apparatus is positioned on an assembly line for said article of manufacture.

11. The testing apparatus of claim 1, wherein said test head is placed onto a plurality of grooves of said article of manufacture for confirming presence of all of at least one ring within each of said plurality of grooves.

12. An testing apparatus for confirming presence of all of at least one ring assembled within a groove of a piston of a vehicle engine, during assembly of said piston, the testing apparatus comprising:
- a test head having an opening with a first amount of air flow through said opening when said opening is not placed onto said groove of said piston;
- and wherein said opening is placed onto said groove of said piston resulting in a second amount of air flow through said opening, and wherein said second amount of air flow depends on the presence of each of said at least one ring within said groove;
- a test head air pressure sensor, coupled to said opening of said test head, for measuring said second amount of air flow through said opening;
- a microcontroller, operatively coupled to said test head air pressure sensor, for determining the presence of all of said at least one ring within said groove from said second amount of air flow through said opening as measured by said test head air pressure sensor;
- a display unit, operatively coupled to said microcontroller, for providing a first indication when the microcontroller determines that all of said at least one ring is present within said groove, and for providing a second indication when the microcontroller determines that any of said at least one ring is not present within said groove;
- a pneumatic cylinder, coupled to said test head, for lowering said test head such that said opening is placed onto said groove of said piston, and for raising said test head after said test head air pressure sensor measures said second amount of air flow through said opening;
- a first air control valve, coupled to a top of said pneumatic cylinder, that opens when said test head is lowered and that closes when said test head is raised;
- a second air control valve, coupled to a bottom of said pneumatic cylinder, that closes when said test head is lowered and that opens when said test head is raised;
- and wherein said microcontroller controls said pneumatic cylinder to lower said test head by opening said first air control valve and by closing said second air control valve, and to raise said test head by closing said first air control valve and by opening said second air control valve;
- a pneumatic cylinder air flow regulator, coupled to said first air control valve and said second air control valve and to an air supply source, for controlling air flow to said pneumatic cylinder from said air supply source;

a pneumatic cylinder air pressure sensor, coupled to said first air control valve and to said second air control valve, for measuring an amount of air flow through said pneumatic cylinder;

and wherein said microcontroller determines, whether said pneumatic cylinder is holding said test head on said groove with a proper force, from said amount of air flow through said pneumatic cylinder as measured by said pneumatic cylinder air pressure sensor;

and wherein said display unit provides a warning indication when the microcontroller determines that said pneumatic cylinder is not holding said test head on said groove with said proper force;

a pneumatic cylinder calibration indicator, coupled to said microcontroller, for notifying the microcontroller that said amount of air flow through the pneumatic cylinder is being calibrated;

and wherein said microcontroller determines whether said amount of air flow through said pneumatic cylinder, as measured by said pneumatic cylinder air pressure sensor, is with a proper range, while said amount of air flow through said pneumatic cylinder is being calibrated;

a calibration display unit further including:
   a first LED that is controlled by said microcontroller to light when said amount of air flow through said pneumatic cylinder, as measured by said pneumatic cylinder air pressure sensor, is above said proper range, while said amount of air flow through said pneumatic cylinder is being calibrated;
   a second LED that is controlled by said microcontroller to light when said amount of air flow through said pneumatic cylinder, as measured by said pneumatic cylinder air pressure sensor, is below said proper range, while said amount of air flow through said pneumatic cylinder is being calibrated; and
   a third LED that is controlled by said microcontroller to light when said amount of air flow through said pneumatic cylinder, as measured by said pneumatic cylinder air pressure sensor, is within said proper range, while said amount of air flow through said pneumatic cylinder is being calibrated;

and wherein said pneumatic cylinder air flow regulator is adjusted to increase said amount of air flow through said pneumatic cylinder when said second LED lights, until said second LED turns off and said third LED lights, while said amount of air flow through said pneumatic cylinder is being calibrated;

and wherein said pneumatic cylinder air flow regulator is adjusted to decrease said amount of air flow through said pneumatic cylinder when said first LED lights, until said first LED turns off and said third LED lights, while said amount of air flow through said pneumatic cylinder is being calibrated;

and wherein said test head air pressure sensor measures said first amount of air flow through said opening of said test head when said test head is not lowered on said groove, and wherein said microcontroller determines whether said first amount of air flow through said opening of said test head is properly calibrated;

and wherein said display unit provides a warning indication when the microcontroller determines that said first amount of air flow through said opening of said test head is not properly calibrated;

a test head calibration indicator, coupled to said microcontroller, for notifying the microcontroller that said first amount of air flow through said opening of said test head is being calibrated when said test head is not lowered on said groove of said piston;

and wherein said microcontroller determines whether said first amount of air flow through said opening of said test head, as measured by said test head air pressure sensor, is within a proper range, while said first amount of air flow through said opening of said test head is being calibrated;

and wherein said first LED of said calibration display unit is controlled by said microcontroller to light when said first amount of air flow through said opening of said test head, as measured by said test head air pressure sensor, is above said proper range, while said first amount of air flow through said opening of said test head is being calibrated;

and wherein said second LED of said calibration display unit is controlled by said microcontroller to light when said first amount of air flow through said opening of said test head, as measured by said test head air pressure sensor, is below said proper range, while said first amount of air flow through said opening of said test head is being calibrated;

and wherein said third LED of said calibration display unit is controlled by said microcontroller to light when said first amount of air flow through said opening of said test head, as measured by said test head air pressure sensor, is within said proper range, while said first amount of air flow through said opening of said test head is being calibrated; and a test head air flow regulator, coupled to said opening of said test head and said air supply source, for controlling air flow to said opening of said test head from said air supply source;

and wherein said test head air flow regulator is adjusted to increase said first amount of air flow through said opening of said test head when said second LED lights, until said second LED turns off and said third LED lights, while said first amount of air flow through said opening of said test head is being calibrated;

and wherein said test head air flow regulator is adjusted to decrease said first amount of air flow through said opening of said test head when said first LED lights, until said first LED turns off and said third LED lights, while said first amount of air flow through said opening of said test head is being calibrated.

13. A method for confirming presence of all of at least one ring within a groove of an article of manufacture during assembly of said article of manufacture, the method including steps of:

A. placing an opening of a test head onto said groove of said article of manufacture, wherein said opening of said test head has a first amount of air flow through said opening when said opening is not placed onto said groove, and wherein said opening of said test head has a second amount of air flow through said opening when said opening is placed onto said groove, and wherein said second amount of air flow depends on the presence of each of said at least one ring within said groove;

B. measuring said second amount of air flow through said opening when said opening of said test head is placed onto said groove; and C. determining the presence of all of said at least one ring within said groove from said second amount of air flow through said opening as measured in said step B.

14. The method of claim 13, further including steps of:
lighting a first LED when all of said at least one ring is determined to be present within said groove; and
lighting a second LED when any of said at least one ring is determined to be not present within said groove.

15. The method of claim 13, further including steps of:
controlling a pneumatic cylinder, that is coupled to said test head, to lower said test head to place said opening of said test head onto said groove; and
controlling said pneumatic cylinder to raise said test head after said second amount of air flow through said opening is measured in said step B.

16. The method of claim 15, further including steps of:
determining whether said pneumatic cylinder is holding said test head on said groove with a proper force; and
providing a warning indication if said pneumatic cylinder is not holding said test head on said groove with said proper force.

17. The method of claim 15, wherein an amount of air flow through said pneumatic cylinder is used for raising and lowering said test head, and wherein the method further includes steps of:
measuring said amount of air flow through said pneumatic cylinder;
determining whether said amount of air flow through said pneumatic cylinder is within a proper range;
lighting a first LED when said amount of air flow through said pneumatic cylinder is above said proper range;
lighting a second LED when said amount of air flow through said pneumatic cylinder is below said proper range;
lighting a third LED when said amount of air flow through said pneumatic cylinder is within said proper range;
increasing said amount of air flow through said pneumatic cylinder when said second LED lights, until said second LED turns off and said third LED lights; and
decreasing said amount of air flow through said pneumatic cylinder when said first LED lights, until said first LED turns off and said third LED lights.

18. The method of claim 13, further including steps of:
determining whether said first amount of air flow through said opening of said test head, when said test head is not lowered on said groove, is properly calibrated; and
providing a warning indication if said first amount of air flow through said opening of said test head is not properly calibrated.

19. The method of claim 13, further including steps of:
determining whether said first amount of air flow through said opening of said test head, when said test head is not lowered on said groove, is within a proper range;
lighting a first LED when said first amount of air flow through said opening of said test head is above said proper range;
lighting a second LED when said first amount of air flow through said opening of said test head is below said proper range;
lighting a third LED when said first amount of air flow through said opening of said test head is within said proper range;
increasing said first amount of air flow through said opening of said test head when said second LED lights, until said second LED turns off and said third LED lights; and
decreasing said first amount of air flow through said opening of said test head when said first LED lights, until said first LED turns off and said third LED lights.

20. The method of claim 13, wherein said at least one ring is assembled within a groove of a piston of a vehicle engine.

21. The method of claim 13, wherein said step A includes the step of placing said test head onto a plurality of grooves of said article of manufacture for confirming presence of all of at least one ring within each of said plurality of grooves.

22. A testing apparatus for confirming presence of all of at least one ring within a groove of an article of manufacture during assembly of said article of manufacture, the testing apparatus comprising:
a test head having an opening with a first amount of air flow through said opening when said opening is not placed onto said groove of said article of manufacture;
and wherein said opening of said test head is placed onto said groove of said article of manufacture resulting in a second amount of air flow through said opening, and wherein said second amount of air flow depends on the presence of each of said at least one ring within said groove;
means for measuring said second amount of air flow through said opening; and
means for determining the presence of all of said at least one ring within said groove from said second amount of air flow through said opening.

23. The testing apparatus of claim 22, further comprising:
means for displaying a first indication when all of said at least one ring is present within said groove, and for displaying a second indication when any of said at least one ring is not present within said groove.

24. The testing apparatus of claim 22, further comprising:
means for lowering said test head such that said opening is placed on said groove of said article of manufacture, and for raising said test head after said second amount of air flow through said opening is measured.

25. The testing apparatus of claim 24, further comprising:
means for calibrating said means for lowering and raising said test head such that said test head is held on said groove with a proper force.

26. The testing apparatus of claim 22, further comprising:
means for determining whether said test head is held on said groove with a proper force; and
means for providing a warning indication when said test head is not held on said groove with said proper force.

27. The testing apparatus of claim 22, further comprising:
means for calibrating said first amount of air flow through said opening of said test head when said test head is not lowered on said groove.

28. The testing apparatus of claim 22, further comprising:
means for determining whether said first amount of air flow through said opening of said test head, when said test head is not lowered on said groove, is within a proper range; and
means for providing a warning indication when said first amount of air flow through said opening of said test head is not within said proper range.

29. The testing apparatus of claim 22, wherein said at least one ring is assembled within a groove of a piston of a vehicle engine.

30. The testing apparatus of claim 22, wherein said testing apparatus is positioned on an assembly line for said article of manufacture.

31. The testing apparatus of claim 22, wherein said test head is placed onto a plurality of grooves of said article of manufacture for confirming presence of all of at least one ring within each of said plurality of grooves.

* * * * *